(12) United States Patent
Tani et al.

(10) Patent No.: US 7,883,107 B2
(45) Date of Patent: Feb. 8, 2011

(54) AIR BAG CONTROL APPARATUS

(75) Inventors: Yasushi Tani, Kobe (JP); Hiroyuki Komaki, Kobe (JP); Yoshikazu Niimi, Aichi (JP)

(73) Assignee: Fijitsu Ten Limited, Kobe-shi (JP)

( * ) Notice: Subject to any disclaimer, the term of this patent is extended or adjusted under 35 U.S.C. 154(b) by 124 days.

(21) Appl. No.: 12/085,430

(22) PCT Filed: Nov. 15, 2006

(86) PCT No.: PCT/JP2006/323255

§ 371 (c)(1),
(2), (4) Date: Jul. 10, 2008

(87) PCT Pub. No.: WO2007/060963

PCT Pub. Date: May 31, 2007

(65) Prior Publication Data

US 2009/0167004 A1    Jul. 2, 2009

(30) Foreign Application Priority Data

Nov. 24, 2005 (JP) ............................. 2005-339130

(51) Int. Cl.
*B60R 21/16* (2006.01)
(52) U.S. Cl. ..................................... 280/735
(58) Field of Classification Search ............... 280/735
See application file for complete search history.

(56) References Cited

U.S. PATENT DOCUMENTS

| | | |
|---|---|---|
| 5,696,776 A | 12/1997 | Spies et al. |
| 6,643,574 B1 | 11/2003 | Swart et al. |
| 7,224,263 B2 | 5/2007 | Maehara |

FOREIGN PATENT DOCUMENTS

| | | |
|---|---|---|
| CN | 1522902 A | 8/2004 |
| EP | 1 602 532 A1 | 12/2005 |

(Continued)

OTHER PUBLICATIONS

Japanese Office action dated Feb. 9, 2009, for priority Japanese application 2005-339130, previously filed in an IDS dated May 7, 2009, noting Japanese references filed in an IDS dated May 21, 2008 and May 7, 2009.

(Continued)

*Primary Examiner*—Faye M. Fleming
(74) *Attorney, Agent, or Firm*—Christie, Parker & Hale, LLP.

(57) ABSTRACT

To prevent short-time energization of an air bag due to a bit error occurring in a safing ON/OFF command, the invention provides an air bag control apparatus comprising a first electronic circuit (3) for generating a firing command based on an output of a main acceleration sensor (1), a second electronic circuit (4) for generating a safing ON command for clearing a safing state, based on an output of a safing acceleration sensor (2), and a firing circuit (8) for generating an air bag inflation permit signal when the firing command and the safing ON command are both input, wherein the second electronic circuit (4) generates a safing OFF command separately from the safing ON command, and sets the safing state by the safing OFF command.

6 Claims, 17 Drawing Sheets

FOREIGN PATENT DOCUMENTS

| | | |
|---|---|---|
| JP | 8-69421 | 3/1996 |
| JP | 2002-347569 | 12/2002 |
| JP | 2004-243955 | 9/2004 |
| JP | 2004-276811 | 10/2004 |
| JP | 2004-284452 | 10/2004 |

OTHER PUBLICATIONS

English translation of Japanese Office action dated Feb. 9, 2009, for priority Japanese application 2005-339130 listed above.

Japanese Office action dated May 9, 2009, for priority Japanese application 2005-339130, noting listed Japanese reference in this IDS, and listed references in the May 21, 2008 IDS.

International Search Report, dated Feb. 20, 2007, corresponding to PCT/JP2006/323255.

Patent Abstracts of Japan, Publication 2002347569 A, Published Dec. 4, 2002, for Fujishima, et al.

Patent Abstracts of Japan, Publication 2004243955 A, Published Sep. 2, 2004, for Miura.

Patent Abstracts of Japan, Publication 2004276811 A, Published Oct. 7, 2004, for Maehara.

Patent Abstracts of Japan, Publication 2004284452 A, Published Oct. 14, 2004, for Shimizu.

Extended European Search Report dated Sep. 22, 2010 for corresponding European Patent Application No. 06833098.4 citing the references listed above, 8pp.

FIG.3

| COMMAND NAME | DATA DIRECTION | COMMAND BITS (BITS 0-6) | DATA BITS (BITS 7-14) | | | | | | | |
|---|---|---|---|---|---|---|---|---|---|---|
| | | | D0 | D1 | D2 | D3 | D4 | D5 | D6 | D7 |
| SAFING ON/OFF | TO ASIC | COMMAND NAME | SPECIFICATION OF SAFING ON/OFF CHANNELS | | | | | | | |
| | ECHO BACK | COMMAND NAME | INFORMATION BEFORE RECOGNIZING COMMAND | | | | | | | |
| SERIAL CHECK | TO ASIC | COMMAND NAME | 0 OR 1 | | | | | | | |
| | ECHO BACK | COMMAND NAME | ON/OFF STATE OF EACH CHANNEL | | | | | | | |

| COMMAND NAME | DATA DIRECTION | COMMAND BITS (BITS 0-6) | DATA BITS (BITS 7-14) |  |  |  |  |  |  |  |
|---|---|---|---|---|---|---|---|---|---|---|
| | | | D0 | D1 | D2 | D3 | D4 | D5 | D6 | D7 |
| SAFING ON | TO ASIC | COMMAND NAME | SPECIFICATION OF SAFING ON CHANNELS ("1"-ON, "0"-INVALID (PREVIOUS STATE RETAINED)) | | | | | | | |
| | ECHO BACK | COMMAND NAME | INFORMATION BEFORE RECOGNIZING COMMAND | | | | | | | |
| SAFING OFF | TO ASIC | COMMAND NAME | SPECIFICATION OF SAFING OFF CHANNELS ("1"-OFF, "0"-INVALID (PREVIOUS STATE RETAINED)) | | | | | | | |
| | ECHO BACK | COMMAND NAME | INFORMATION BEFORE RECOGNIZING COMMAND | | | | | | | |
| SERIAL CHECK | TO ASIC | COMMAND NAME | 0 OR 1 | | | | | | | |
| | ECHO BACK | COMMAND NAME | ON/OFF STATE OF EACH CHANNEL | | | | | | | |

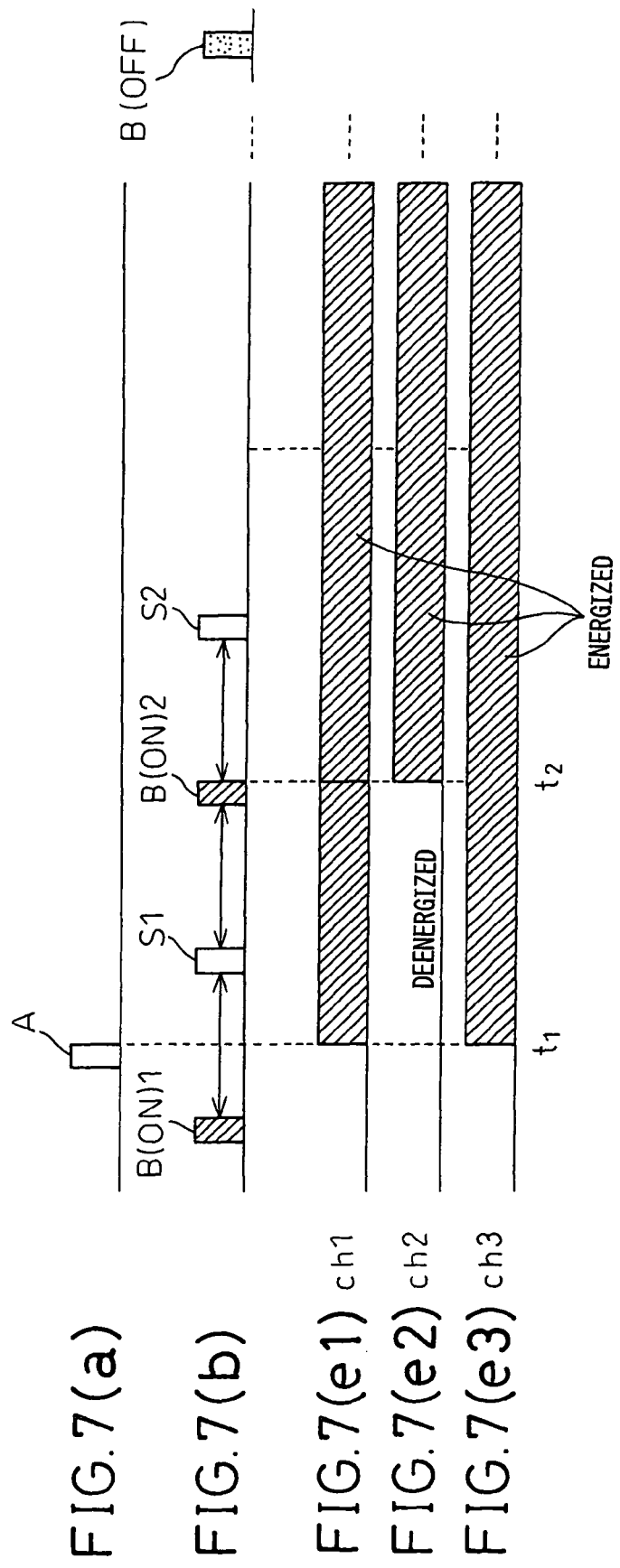

FIG.9

| COMMAND NAME | DATA DIRECTION | COMMAND BITS (BITS 0-6) | DATA BITS (BITS 7-14) | | | | | | | |
|---|---|---|---|---|---|---|---|---|---|---|
| | | | D0 | D1 | D2 | D3 | D4 | D5 | D6 | D7 |
| SAFING ON/OFF COMMAND 1 | TO ASIC | COMMAND NAME | SPECIFICATION OF SAFING ON/OFF CHANNELS ("1"-ON, "0"-OFF) | | | | | | | |
| | ECHO BACK | COMMAND NAME | INFORMATION BEFORE RECOGNIZING COMMAND | | | | | | | |
| SAFING ON/OFF COMMAND 2 | TO ASIC | COMMAND NAME | SPECIFICATION OF SAFING ON/OFF CHANNELS ("1"-ON, "0"-OFF) | | | | | | | |
| | ECHO BACK | COMMAND NAME | INFORMATION BEFORE RECOGNIZING COMMAND | | | | | | | |
| SERIAL CHECK | TO ASIC | COMMAND NAME | 0 OR 1 | | | | | | | |
| | ECHO BACK | COMMAND NAME | ON/OFF STATE OF EACH CHANNEL | | | | | | | |

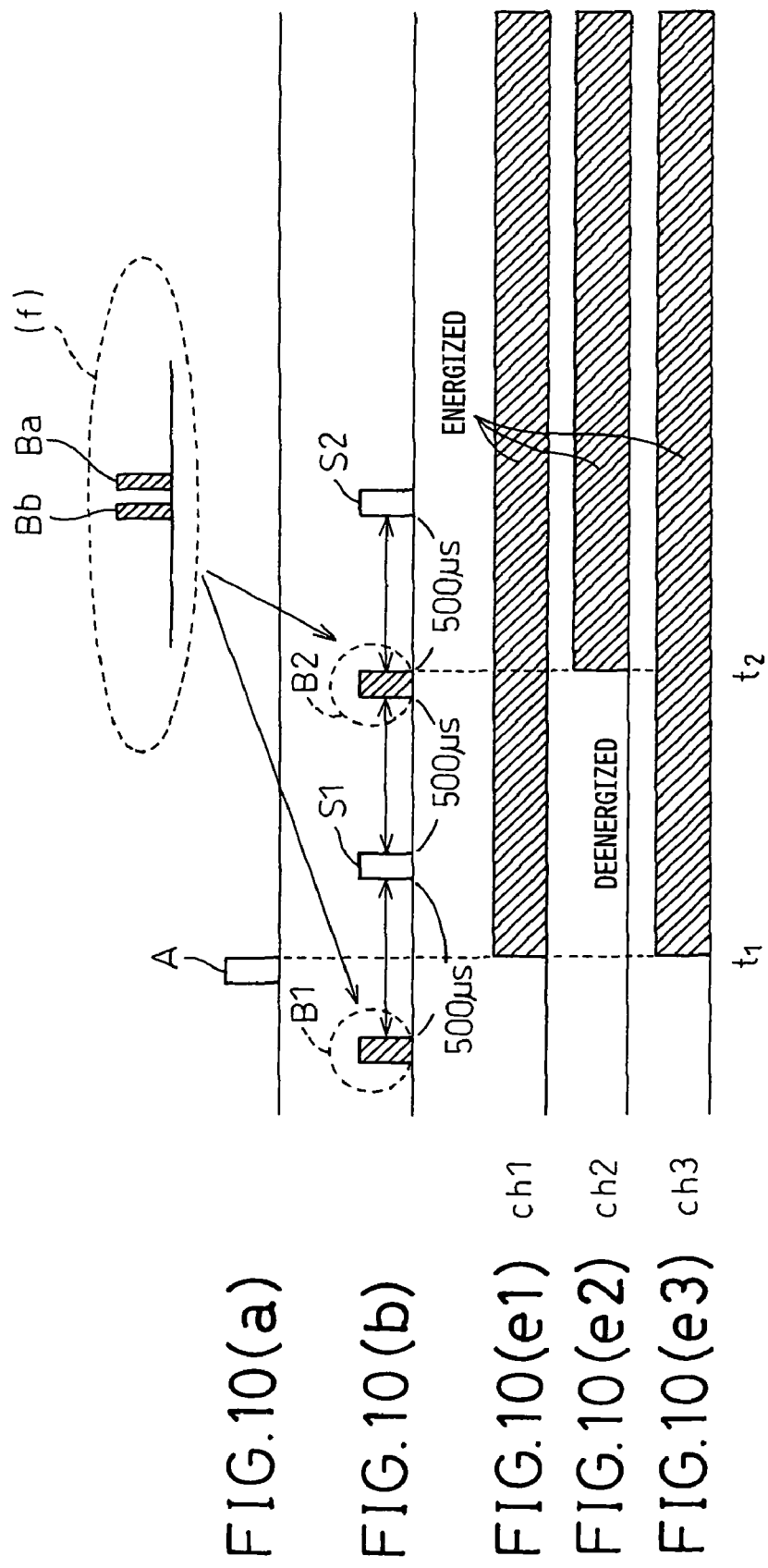

FIG.15

| COMMAND NAME | | DATA DIRECTION | COMMAND BITS (BITS 0-6) | DATA BITS (BITS 7-14) | | | | | | | |
|---|---|---|---|---|---|---|---|---|---|---|---|
| | | | | D0 | D1 | D2 | D3 | D4 | D5 | D6 | D7 |
| SAFING ON/OFF COMMAND | | TO ASIC | COMMAND NAME | ch1 | | ch2 | | ch3 | | ch4 | |
| | | ECHO BACK | COMMAND NAME | INFORMATION BEFORE RECOGNIZING COMMAND | | | | | | | |
| SERIAL CHECK | | TO ASIC | COMMAND NAME | 0 OR 1 | | | | | | | |
| | | ECHO BACK | COMMAND NAME | ON/OFF STATE OF EACH CHANNEL | | | | | | | |

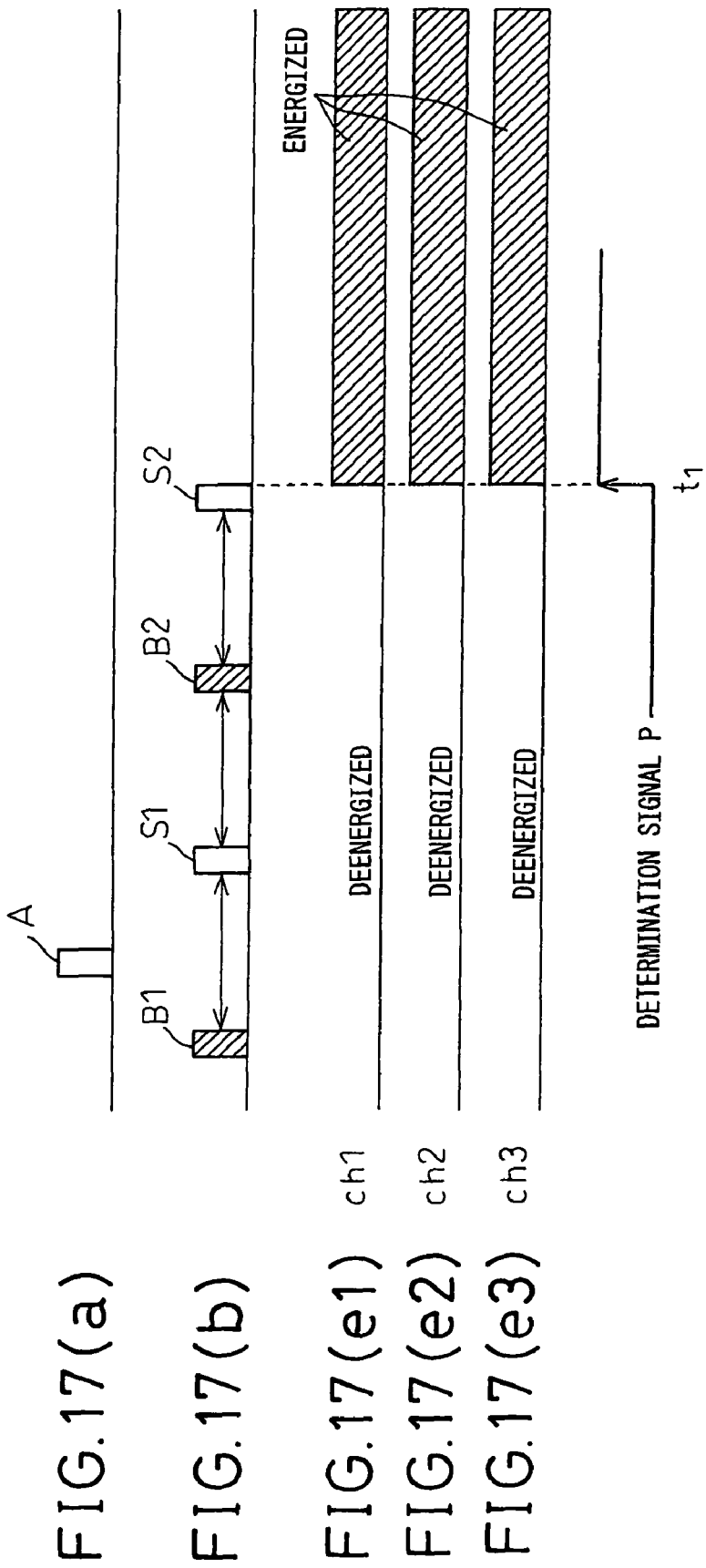

AIR BAG CONTROL APPARATUS

CROSS-REFERENCE TO RELATED APPLICATION

This application is a National Phase Patent Application and claims the priority of International Application Number PCT/JP2006/323255, filed on Nov. 15, 2006, which claims priority of Japanese Patent Application Number 2005-339130, filed on Nov. 24, 2005.

DETAILED DESCRIPTION OF THE INVENTION

1. Technical Field

The present invention relates to a control apparatus for inflating an air bag based on a detection result from an acceleration sensor, and more specifically to an air bag control apparatus that employs an electronic safing technique.

2. Background Art

In recent years, with increasing awareness of vehicle safety, vehicles have come to be equipped with air bag systems which provide occupant protection in the event of a vehicle crash; in particular, driver and passenger air bags are mounted as standard equipment on all new vehicles. In an apparatus for controlling air bag inflation, a system for ensuring the reliability of its operation, generally known as the safing system, is employed which includes a mechanical acceleration sensor (safing sensor) for detecting a crash independently of the main (firing system) acceleration (G) sensor and which outputs an air bag inflation permit signal only when both of the sensors have detected a crash (refer, for example, to Japanese Unexamined Patent Publication No. 2002-347569).

There has recently been developed an electronic safing system in which an electronic two-axis G sensor capable of detecting front, rear, and left and right side crashes is employed to replace the mechanical safing sensor and a crash discrimination logic IC or microcomputer is provided for the safing sensor in order to achieve high-performance crash detection (refer, for example, to Japanese Unexamined Patent Publication No. 2004-276811). This system employs a two-CPU configuration comprising a main microcomputer, which processes the output of the firing system G sensor for crash discrimination, and a sub-microcomputer, which processes the output of the safing sensor for crash discrimination, with provisions made to protect each CPU against failure of the other CPU.

FIG. 1 is a block diagram schematically showing the configuration of a prior art air bag ECU. In the figure, reference numeral 1 is an electronic main G sensor, and 2 is an electronic safing sensor constructed, for example, from a two-axis G sensor for detecting front, rear, and left and right side crashes. Reference numeral 3 is a main microcomputer which produces a firing command by performing frontal crash discrimination based on the output of the main G sensor 1; the firing command produced here carries information specifying the channel to be fired and is transmitted to an integrated ASIC 5 by means of serial communication. The channel specifying information is information for specifying an air bag to be inflated, selected from among a plurality of vehicle-mounted air bags according to the type of the detected crash.

A sub-microcomputer 4 produces a safing ON/OFF command by performing frontal crash safing discrimination and front side crash discrimination based on the output of the safing G sensor 2. The safing ON/OFF command carries information specifying the channel whose safing state is to be cleared or set, and is transmitted to the integrated ASIC 5 by means of serial communication. The main microcomputer 3 and the sub-microcomputer 4 are each equipped with a fault diagnosis function and configured to constantly check whether the air bag ECU is operating correctly.

The integrated ASIC 5 includes: a firing serial receiving unit 6 which receives the firing command from the main microcomputer 3; a safing serial receiving unit 7 which receives the safing ON/OFF command from the sub-microcomputer 4; and a firing circuit 8. The firing circuit 8 includes as many circuits 8, 8', 8", . . . as there are air bags (channels), and controls an external power supply to supply firing power to squibs 9 connected to the respective circuits.

The firing serial receiving unit 6 includes: a serial communication circuit 6a which receives the firing command transmitted from the main microcomputer 3 by means of serial communication and decodes it into a high-side ON command and a low-side ON command for each channel; logic gates 6d, 6e, and 6f; and latch circuits 6g and 6h. The serial communication circuit 6a has the function of echoing back the command data bits directly into the direction of the main microcomputer 3. The logic gate 6f takes as an input a firing determination signal from the main microcomputer 5, and supplies its output to the latch circuits 6g and 6h which then latch the firing requests output from the logic gates 6d and 6e and produce a firing signal. An energization timer 6i is provided to forcefully turn off the firing signal produced by the firing command after a predetermined time has elapsed. This serves to prevent the air bag from being kept energized after the air bag has been inflated by being activated, for example, by the impact of a crash.

The safing serial receiving unit 7 includes a serial communication circuit 7a which receives the safing ON/OFF command transmitted from the sub-microcomputer 4 by means of serial communication and decodes it into a safing ON/OFF command B, B' and a serial check command S. The serial check command S is command for causing the ON/OFF state (safing signal) of each channel to be echoed back.

The firing circuit 8 includes: first and second AND gates 8a and 8b to which are input the firing signal from the firing serial receiving unit 6 and the safing signal from the safing serial receiving unit 7; and first and second transistors 8c and 8d which are controlled ON and OFF by the outputs of the respective AND gates. The transistors 8c and 8d are connected via the air bag squib 9 in series between the power supply and ground. Accordingly, the first and second transistors 8c and 8d conduct to supply power to the squib 9 for air bag inflation only when the signal for clearing the safing state (safing ON) and the firing signal are input to the AND gates 8a and 8b.

On the other hand, when a false firing command is transmitted from the main microcomputer 3 due, for example, to noise or runaway of the microcomputer, since the safing ON command is not transmitted from the sub-microcomputer 4, the firing signal is blocked by the AND gates 8a and 8b in the firing circuit, and therefore the first and second transistors 8c and 8d do not conduct. The squib 9 is thus prevented from being fired by the false firing signal. Further, when a false safing ON command is produced by the sub-microcomputer 4, the safing signal is likewise blocked by the AND gates 8a and 8b, preventing the squib 9 from being fired erroneously. In this way, the safing provides redundancy for enhancing the reliability of the firing operation in the air bag system, and serves to prevent the system from malfunctioning and accidentally inflating the air bag in the event of a false firing request from the main microcomputer or the sub-microcomputer.

FIG. 2 is a timing chart for explaining the operation of the system shown in FIG. 1: part (a) shows the timing of the signal serially transmitted from the main microcomputer 3, and part (b) shows the timing of the signal serially transmitted from the sub-microcomputer 4. In part (a) of FIG. 2, A indicates the firing command, and in part (b), B indicates the safing ON command and B' indicates the safing OFF command. Further, part (c) shows the output waveform C (safing signal) of the sating serial receiving unit 7, (d) shows the output waveform D of the firing serial receiving unit 6, and (e) shows the energization state E of the squib 9.

For example, when energizing channels (chs) 1, 2, and 3 (by flowing currents to the squibs 9 for air bag inflation), the firing command A specifying the channels 1, 2, and 3 and the firing determination signal (not shown in FIG. 2) are transmitted to the integrated ASIC 5 from the main microcomputer 5, whereupon the firing signal D rises at time t1 as shown, and ends at the expiration of the time specified by the energization timer 6i (at time t3). On the other hand, the safing signal C rises (at time t2) upon reception of the safing ON command B (for channels 1, 2, and 3) from the sub-microcomputer 4 which detects a crash on a different line than the main microcomputer 3, and ends when the safing OFF command B' is accepted (at time t4). When the firing signal D and the safing signal C are both ON, the firing circuit 8 fires the squibs 9 on the channels 1, 2, and 3 for air bag inflation. The energization of the squibs 9 ends when the firing signal D ends (at time t3).

FIG. 3 shows the kinds and characteristics of the commands that the sub-microcomputer 4 produces. In the command table of FIG. 3, the safing ON/OFF command specifies the command name by using the bits in positions 0 to 6, and specifies the channels D0 to D7 for safing ON or OFF by setting the corresponding bits in positions 7 to 14 to "1" or "0". For any channel, the safing is ON when the corresponding data bit is set to "1" and OFF when it is set to "0". Safing ON means clearing the safing state, while the safing OFF means causing the safing cleared state to change to the safing state.

Information before the safing ON/OFF command is recognized as a command is echoed back to the sub-microcomputer 4, and when the information echoed back matches the transmitted information, it is recognized as a command. The serial check command is command for causing the safing ON/OFF state of each channel in the safing serial receiving unit 7 to be echoed back to the sub-microcomputer 4.

Since the safing ON/OFF command sets the safing ON when the corresponding bit is set to "1" and OFF when it is set to "0", as described above, if a bit error occurs during the transmission of the command, the channel to be set to safing ON may be set to safing OFF, or conversely, the channel to be set to safing OFF may be set to safing ON; as a result, a short-time energized state such as described below may occur when simultaneously controlling a plurality of channels, and this can result in a situation where the air bag cannot be inflated correctly.

FIG. 4 is a timing diagram for explaining the occurrence of such a short-time energized state. In the example of FIG. 4, the firing command and the safing ON/OFF command are both output for the channels (chs) 1 to 3. In FIG. 4, part (a) shows the firing serial, (b) the safing serial, (e1) the energization state of the channel 1 (ch1), (e2) the energization state of the channel 2 (ch2), and (e3) the energization state of the channel 3 (ch3). Further, A indicates the firing command, and B1, B2, and B3 each indicate the safing ON command, while S1, S2, and S3 each indicate the serial check command. In the safing serial, the safing ON command B (B1, B2, B3, . . . ) and the serial check command C (C1, C2, C3, . . . ) are output repeatedly and alternately, for example, at intervals of 500 µs.

Suppose here that the safing ON command B1 was output for ch1, ch2, and ch3, but that the safing ON command for ch2 was received as the safing OFF command due to a data bit error and the safing ON command was received correctly only for ch1 and ch3. In this situation, when the firing command A is output for ch1, ch2, and ch3 at time t1, the firing circuits for ch1 and ch3 change from deenergized to energized state at time t1, but the firing circuit for ch2 does not change to the energized state but remains in the deenergized state.

The safing serial outputs the serial check command S1 500 µs after the safing ON command B1, trying to check the safing state effected by the safing ON command B1. As a result, the sub-microcomputer 4 detects that ch2 is not set to sating ON although the safing ON command for it was output. The sub-microcomputer 4 next outputs the safing ON command B2 500 µs after the serial check command S, trying to clear the safing on ch1, ch2, and ch3. As a result, the safing on ch2 is cleared, and the air bag on ch2 is put in an energized state. Suppose here that a data bit error occurred in the safing ON command B2 for ch1 and a bit "0" was output for ch1 instead of a bit "1"; in this case, the safing is set on ch1, and the energization of the air bag on ch1 thus stops.

Since this state is detected by the serial check command S2 output to check the safing state effected by the safing ON command B2, the sub-microcomputer 4 again outputs the safing ON command B3 to try to clear the safing on ch1, ch2, and ch3. When the safing on all the channels ch1 to ch3 is cleared at time t3, power is supplied to inflate the air bags on the corresponding channels. This result is reported to the sub-microcomputer 4 by the serial check command S3.

As shown in the timing diagram of FIG. 4, ch1 is energized during the period from t1 to t2, but the energization to ch1 may stop due to a bit error occurring in the safing ON command B2 output to activate ch2. In this case, ch1 is short-time energized only during the period from t1 to t2. This is called short-time energization, and if the period from t1 to t2 is short, a situation occurs where the air bag cannot be inflated correctly. The time interval between the safing ON command and the serial check command inevitably becomes shorter as the number of channels, i.e., the number of air bags mounted in one vehicle, increases. As a result, if short-time energization such as shown in FIG. 4 occurs, a situation can occur where the corresponding air bag cannot be inflated correctly.

DISCLOSURE OF THE INVENTION

The present invention has been devised to prevent the occurrence of such short-time energization and thereby ensure reliable air bag inflation.

To achieve the above object, a first air bag control apparatus according to the present invention comprises: a first electronic circuit for generating a firing command based on an output of a main acceleration sensor; a second electronic circuit for generating a safing ON command for clearing a safing state, based on an output of a safing acceleration sensor; and a firing circuit for generating an air bag inflation permit signal when the firing command and the safing ON command are both input, wherein the second electronic circuit is configured to generate a safing OFF command separately from the safing ON command and to set the safing state by the safing OFF command.

In the first air bag control apparatus, the second electronic circuit further generates a check command for detecting, by echo back, an input state to the firing circuit that has been set by the safing ON command.

When it is detected by the check command that the input to the firing circuit is not set to a safing cleared state even if the safing ON command was transmitted, the second electronic circuit retransmits the safing ON command.

In the air bag control apparatus according to the first invention described above, since the safing ON command and the safing OFF command are generated as separate commands, even if a bit error occurs in the safing ON command, the safing ON command will not be erroneously recognized as the safing OFF command. This solves the problem of short-time energization of the air bag occurring due to a bit error in the safing ON command, and serves to ensure reliable air bag inflation.

To achieve the above object, a second air bag control apparatus according to the present invention comprises: a first electronic circuit for generating a firing command based on an output of a main acceleration sensor; a second electronic circuit for generating an ON command for clearing a safing state, based on an output of a safing acceleration sensor; and a firing circuit for generating an air bag inflation permit signal when the firing command and the ON command are both input, wherein the second electronic circuit is configured to generate separately from the safing ON command an OFF command for setting the safing state, and wherein when the ON command or the OFF command is invalid, a previous safing state is retained.

In the above configuration, the occurrence of an abnormality such as short-time energization can be prevented by retaining the previous safing state when the ON command or the OFF command is rendered invalid due to a bit error.

The present invention may also be carried out in any one of the following modes, i.e., according to a third invention, an air bag control apparatus comprises: a first electronic circuit for generating a firing command based on an output of a main acceleration sensor; a second electronic circuit for generating based on an output of a safing acceleration sensor a safing ON/OFF command which, when set to a given one of two binary states, serves as a safing ON command for clearing a safing state, and when set to the other binary state, serves as a safing OFF command for setting the safing state; and a firing circuit for generating an air bag inflation permit signal when the firing command and the safing ON command are both input, wherein the safing ON/OFF command is generated as at least two successive commands, and is recognized as a valid command only when the values of the two commands match.

In the third invention, the second electronic circuit may further generate a check command for detecting, by echo back, an input state to the firing circuit that has been set by the safing ON/OFF command. In this case, when it is detected by the check command that the input to the firing circuit is not set to the safing cleared state even if the safing ON command was transmitted, the second electronic circuit may retransmit the safing ON command.

According to a fourth invention, an air bag control apparatus comprises: a first electronic circuit for generating a firing command based on an output of a main acceleration sensor; a second electronic circuit for generating based on an output of a sating acceleration sensor a safing ON/OFF command which, when set to a given one of two binary states, serves as a safing ON command for clearing a safing state and, when set to the other binary state, serves as a safing OFF command for setting the safing state; and a firing circuit for generating an air bag inflation permit signal when the firing command and the safing ON command are both input, wherein the control apparatus further includes an energization detection circuit for detecting an energization state of an air bag effected by an output of the firing circuit, and a latch circuit for latching an output of the second electronic circuit before coupling to the firing circuit when energization to the air bag is detected by the energization detection circuit.

In this case, the second electronic circuit may further generate a check command for detecting, by echo back, an input state to the firing circuit that has been set by the safing ON/OFF command. Further, when it is detected by the check command that the input to the firing circuit is not set to the safing cleared state even if the safing ON command was transmitted, the second electronic circuit may retransmit the safing ON command.

According to a fifth invention, an air bag control apparatus comprises: a first electronic circuit for generating a firing command based on an output of a main acceleration sensor; a second electronic circuit for generating based on an output of a safing acceleration sensor a safing ON/OFF command which, when set to a given one of two binary states, serves as a safing ON command for clearing a safing state and, when set to the other binary state, serves as a safing OFF command for setting the safing state; and a firing circuit for generating an air bag inflation permit signal when the firing command and the safing ON command are both input, wherein the second electronic circuit generates the safing ON/OFF command as a plurality of independent commands one for each of a plurality of air bags to be controlled.

In this case, the second electronic circuit may further generate a check command for detecting, by echo back, an input state to the firing circuit that has been set by the safing ON/OFF command. Further, when it is detected by the check command that the firing circuit is not set to the safing cleared state for any particular air bag even if the safing ON command was transmitted, the second electronic circuit may retransmit the safing ON command only for that particular air bag.

According to a sixth invention, an air bag control apparatus comprises: a first electronic circuit for generating a firing command based on an output of a main acceleration sensor; a second electronic circuit for generating based on an output of a safing acceleration sensor a safing ON/OFF command which, when set to a given one of two binary states, serves as a safing ON command for clearing a safing state and, when set to the other binary state, serves as a safing OFF command for setting the safing state; and a firing circuit for generating an air bag inflation permit signal when the firing command and the safing ON command are both input, wherein the safing ON/OFF command generated by the second electronic circuit contains channel specifying information for specifying each one of a plurality of air bags, and wherein the channel specifying information comprises at least two bits, and the command is recognized as a valid command only when the values of the two bits match.

In this case, the second electronic circuit may further generate a check command for detecting, by echo back, an input state to the firing circuit that has been set by the safing ON/OFF command. Further, when it is detected by the check command that the input to the firing circuit is not set to the safing cleared state even if the safing ON command was transmitted, the second electronic circuit may retransmit the safing ON command.

According to a seventh invention, an air bag control apparatus comprises: a first electronic circuit for generating a firing command based on an output of a main acceleration sensor; a second electronic circuit for generating based on an output of a safing acceleration sensor a safing ON/OFF command which, when set to a given one of two binary states, serves as a safing ON command for clearing a safing state and, when set to the other binary state, serves as a safing OFF command for setting the safing state; and a firing circuit for generating an air bag inflation permit signal when the firing command and the safing ON command are both input, wherein a gate circuit is provided between the second electronic circuit and the firing circuit, and when the safing ON/OFF command being output to the gate circuit is detected by echo back, the second electronic circuit supplies a determination signal to the gate circuit, thus causing the gate circuit to open.

BRIEF DESCRIPTION OF THE DRAWINGS

FIG. 3 shows the characteristics of commands used in the ECU of FIG. 1.

FIG. 4(a) shows the energization state of the firing serial in the ECU of FIG. 1.

FIG. 4(b) shows the energization state of the safing serial in the ECU of FIG. 1.

FIG. 4(e2) shows the energization state of channel 2 (ch2) in the ECU of FIG. 1.

FIG. 4(e3) shows the energization state of channel 3 (ch3) in the ECU of FIG. 1.

FIG. 6 shows the characteristics of commands used in the ECU of FIG. 5.

FIG. 7(a) shows the energization state of the firing serial in the ECU of FIG. 5.

FIG. 7(b) shows the energization state of the safing serial in the ECU of FIG. 5.

FIG. 7(e1) shows the energization state of channel 1 (ch1) in the ECU of FIG. 5.

FIG. 7(e2) shows the energization state of channel 2 (ch2) in the ECU of FIG. 5.

FIG. 7(e3) shows the energization state of channel 3 (ch3) in the ECU of FIG. 5.

FIG. 9 shows the characteristics of commands used in the ECU of FIG. 8.

FIG. 10(a) shows the energization state of the firing serial in the ECU of FIG. 8.

FIG. 10(b) shows the energization state of the safing serial in the ECU of FIG. 8.

FIG. 10(e1) shows the energization state of channel 1 (ch1) in the ECU of FIG. 8.

FIG. 10(e2) shows the energization state of channel 2 (ch2) in the ECU of FIG. 8.

FIG. 10(e3) shows the energization state of channel 3 (ch3) in the ECU of FIG. 8.

FIG. 12(a) shows the energization state of the firing serial in the ECU of FIG. 11.

FIG. 12(b) shows the energization state of the safing serial in the ECU of FIG. 11.

FIG. 12(e2) shows the energization state of channel 2 (ch2) in the ECU of FIG. 11.

FIG. 12(e3) shows the energization state of channel 3 (ch3) in the ECU of FIG. 11.

FIG. 14(a) shows the energization state of the firing serial in the ECU of FIG. 13.

FIG. 14(b) shows the energization state of the safing serial in the ECU of FIG. 13.

FIG. 14(e2) shows the energization state of channel 2 (ch2) in the ECU of FIG. 13.

FIG. 14(e3) shows the energization state of channel 3 (ch3) in the ECU of FIG. 13.

FIG. 15 shows the characteristics of commands according to a fifth embodiment of the present invention.

FIG. 17(a) shows the energization state of the firing serial in the ECU of FIG. 16.

FIG. 17(b) shows the energization state of the safing serial in the ECU of FIG. 16.

FIG. 17(e1) shows the energization state of channel 1 (ch1) in the ECU of FIG. 16.

FIG. 17(e2) shows the energization state of channel 2 (ch2) in the ECU of FIG. 16.

FIG. 17(e3) shows the energization state of channel 3 (ch3) in the ECU of FIG. 16.

BEST MODE FOR CARRYING OUT THE INVENTION

Embodiment 1

Figure 1:
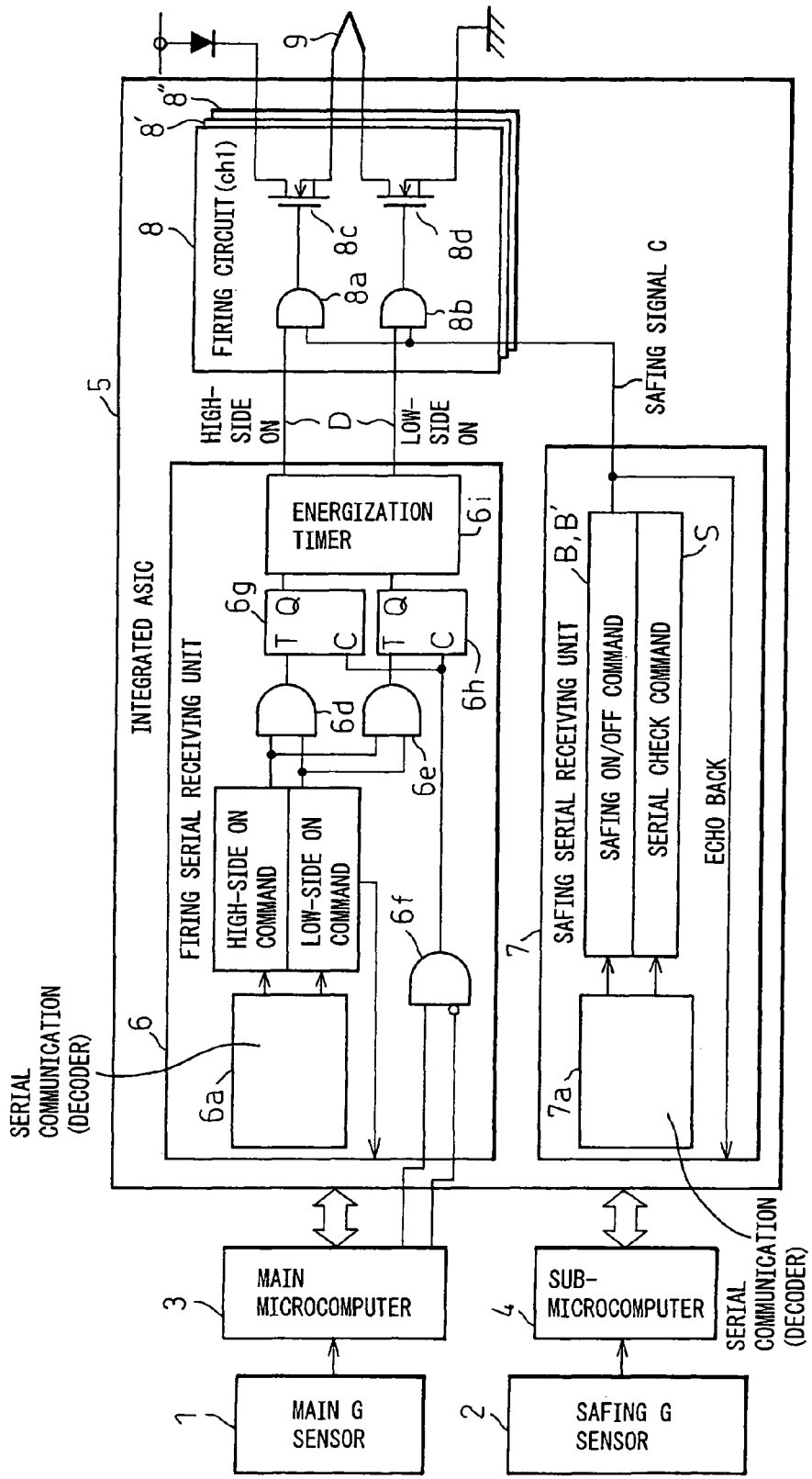
FIG. 1 is a block diagram showing the configuration of a prior art air bag ECU.
Figure 2:
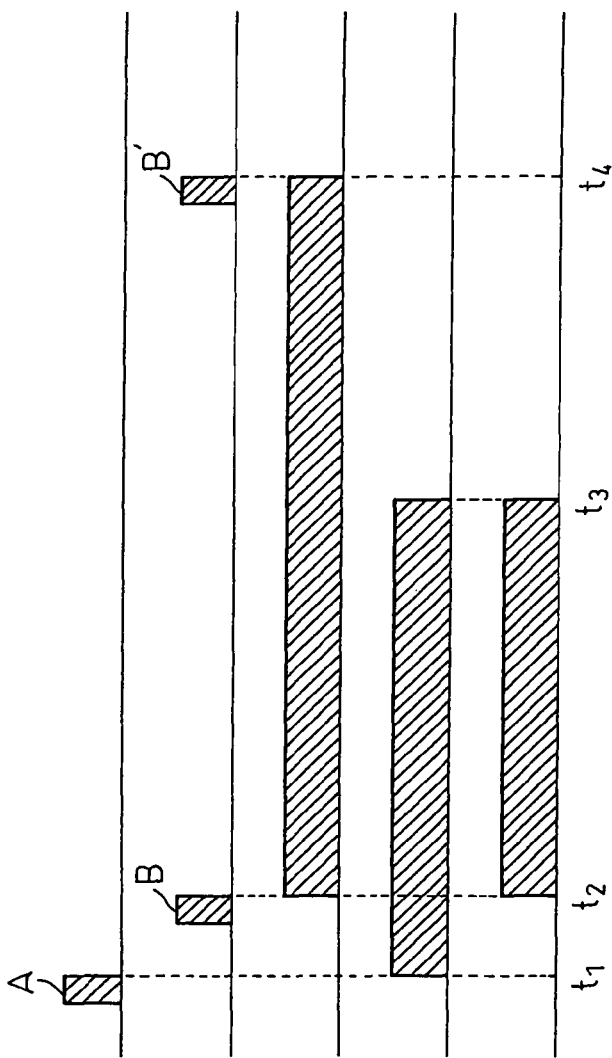
FIG. 2(a) shows the timing of a signal serially transmitted from a main microcomputer 3 in the ECU of FIG. 1.
FIG. 2(b) shows the timing of a signal serially transmitted from a sub-microcomputer 4 in the ECU of FIG. 1.
FIG. 2(c) shows an output waveform C (safing signal) of a safing serial receiving unit 7 in the ECU of FIG. 1.
FIG. 2(d) shows an output waveform D of a firing serial receiving unit 6 in the ECU of FIG. 1.
FIG. 2(e) shows the energization state E of a squib 9 in the ECU of FIG. 1.

A first embodiment of the present invention will be described below with reference to FIGS. 5 to 7. Throughout the figures given herein, the same reference numerals as those in FIGS. 1 to 4 designate the same or similar component elements, and therefore, the description thereof will not be repeated. FIG. 5 is a block diagram showing the configuration of an air bag ECU according to the present embodiment, FIG. 6 is a command table showing the structure of safing ON/OFF commands according to the present embodiment, and FIG. 7 is a timing diagram for explaining the channel control using the safing ON/OFF commands according to the present embodiment.

In the present embodiment, the safing ON/OFF command is generated as two independent commands, a safing ON command B(ON) and a safing OFF command B(OFF), each having a structure such as shown in the command table of FIG. 6. The commands B(ON) and B(OFF) and the serial check command S are created by the sub-microcomputer 40 and transmitted to the safing serial receiving unit 70 in the ASIC 50. Reference numeral 70a is a serial communication circuit for receiving the commands. The ON/OFF state of each channel effected by the reception of the safing ON/OFF command is echoed back to the sub-microcomputer 40 by the serial check command S.

As shown in FIG. 5, the air bag ECU of the present embodiment is characterized in that the sub-microcomputer 40 generates the safing ON command B(ON) and safing OFF command B(OFF) which are independent of each other. Accordingly, the safing serial receiving unit 70 receives the safing ON command B(ON), the safing OFF command B(OFF), and the serial check command S serially at predetermined intervals of time, for example, at intervals of 500 As, as shown in FIG. 7(b).

As shown in FIG. 6, the safing ON command specifies the command name by using the command bits in positions 0 to 6, and specifies the channels D0 to D7 for safing ON by using the data bits in positions 7 to 14. Any channel to be set to safing ON is specified by setting a corresponding one of the data bits 7 to 14 to "1" and, if the data bit is set to "0", the data bit is rendered invalid, and the previous data state is retained.

Likewise, as shown in FIG. 6, the safing OFF command specifies the command name by using the command bits in positions 0 to 6, and specifies the channels D0 to D7 for safing OFF by using the data bits in positions 7 to 14. Any channel to be set to safing OFF is specified by setting a corresponding one of the data bits 7 to 14 to "1" and, if the data bit is set to "0", the data bit is rendered invalid, and the previous data state is retained.

Referring to FIG. 7, a description will be given below of how the short-time energized state can be prevented in the apparatus of the present embodiment. In FIG. 7, as in FIG. 4, part (a) shows the firing serial, (b) the safing serial, (e1) the energization state of the channel 1 (ch1), (e2) the energization state of the channel 2 (ch2), and (e3) the energization state of the channel 3 (ch3).

When the firing command A is output at time t1 following the output of the safing ON command B(ON), as shown in FIG. 7(b), the firing circuits 8 for ch1, ch2, and ch3 should change from deenergized to energized state but, due to a bit error occurring in the safing ON command output for ch2, the bit is not set to "1" for ch2 which thus remains in the deenergized state. Since this state is checked by the serial check command S1 output 500 µs after the safing ON command B(ON) 1, the sub-microcomputer 40 outputs the safing ON command B(ON) 2 again for ch1 to ch3 at time t2. As a result, the energization state of ch2 changes from deenergized to energized. The safing ON command B(ON) 2 is also output for ch1 and ch3 already put in the energized state; here, if a bit error occurs and a bit "0" is received for any one of the channels instead of the bit "1", this signal is rendered invalid as shown in the command table of FIG. 6, and the previous state, i.e., the energized state, is retained. As a result, all the channels are put in the energized state at time t2, thus preventing the occurrence of short-time energization. This result is checked by the serial check command S2.

Figure 4:
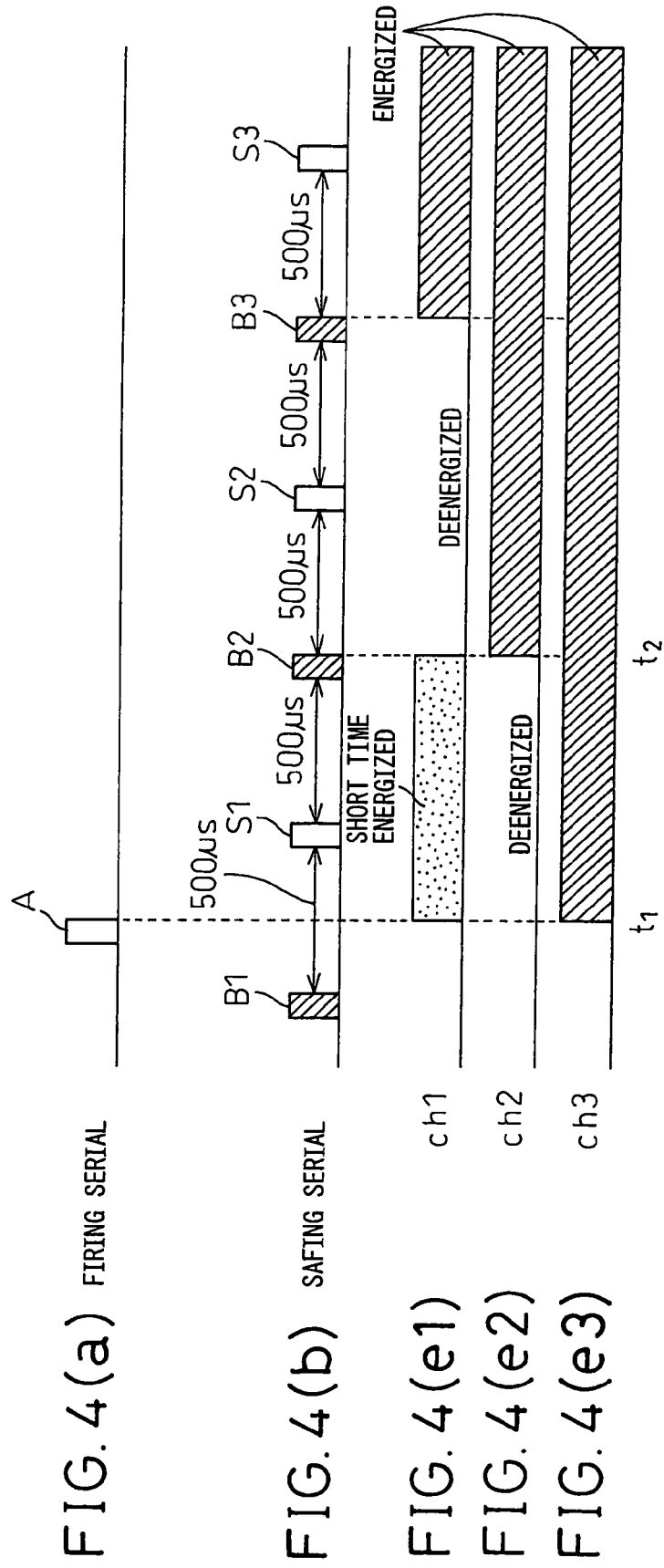
FIG. 4(e1) shows the energization state of channel 1 (ch1) in the ECU of FIG. 1.
Figure 5:
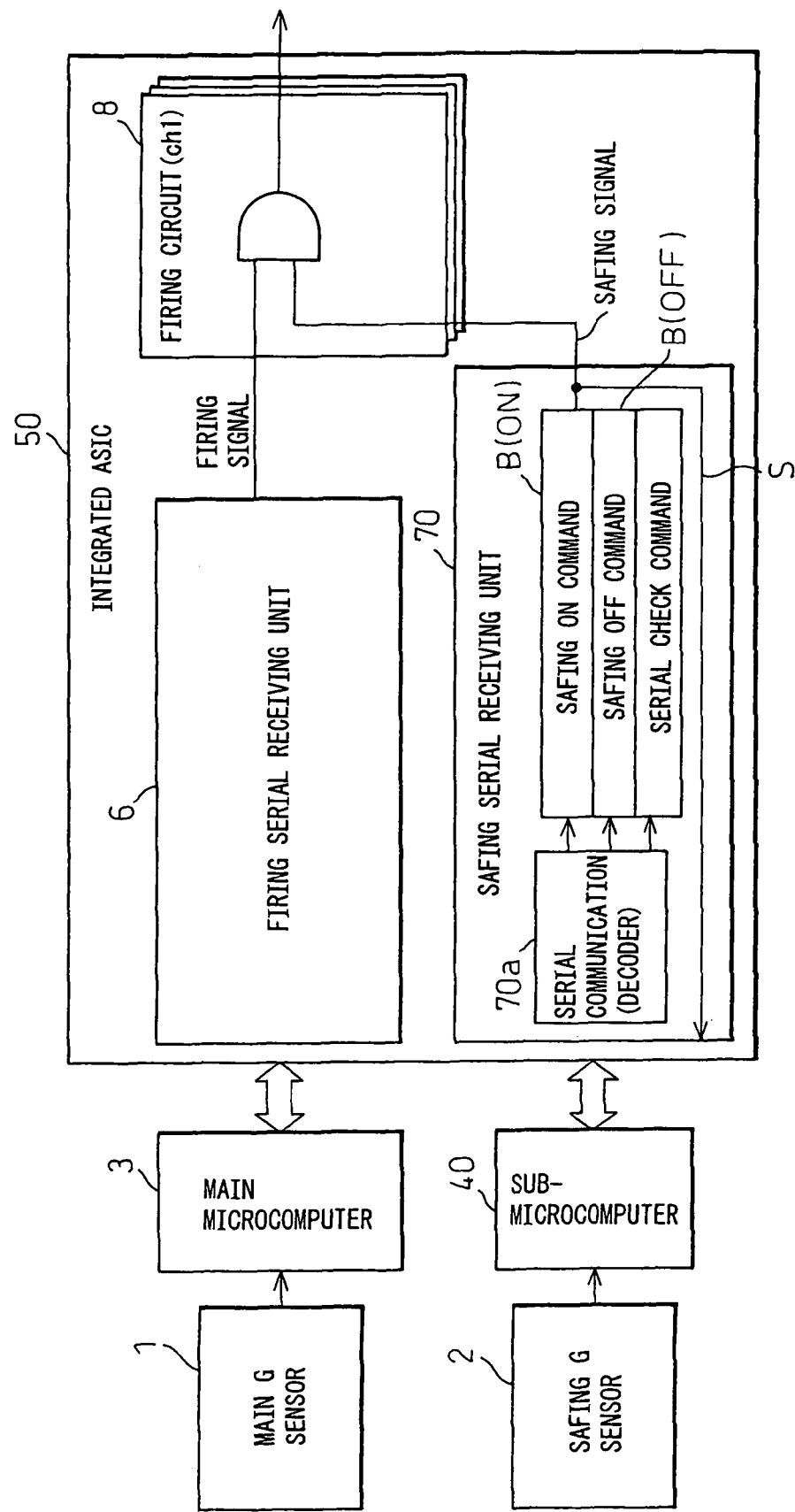
FIG. 5 is a block diagram showing the configuration of an air bag ECU according to a first embodiment of the present invention.

In this way, in the apparatus of the present embodiment, since the safing ON command B(ON) and the safing OFF command B(OFF) are generated as separate independent commands, any channel once set to the energized state is prevented from being erroneously deenergized due to a bit error occurring in the safing ON command, or any channel is prevented from being erroneously energized by the safing OFF command, and as a result, the problem of short-time energization such as shown in FIG. 4 will not occur.

Embodiment 2

A second embodiment of the present invention will be described below with reference to FIGS. 8 to 10. In this embodiment, the safing ON/OFF command is generated as two successive commands 1 and 2, and the ON/OFF request made by the command is rendered valid only when the two match. Since the probability that bit errors occur in both of the successive commands is extremely low, the present embodiment can prevent an erroneous safing ON or safing OFF situation arising due to a bit error.

Figure 8:
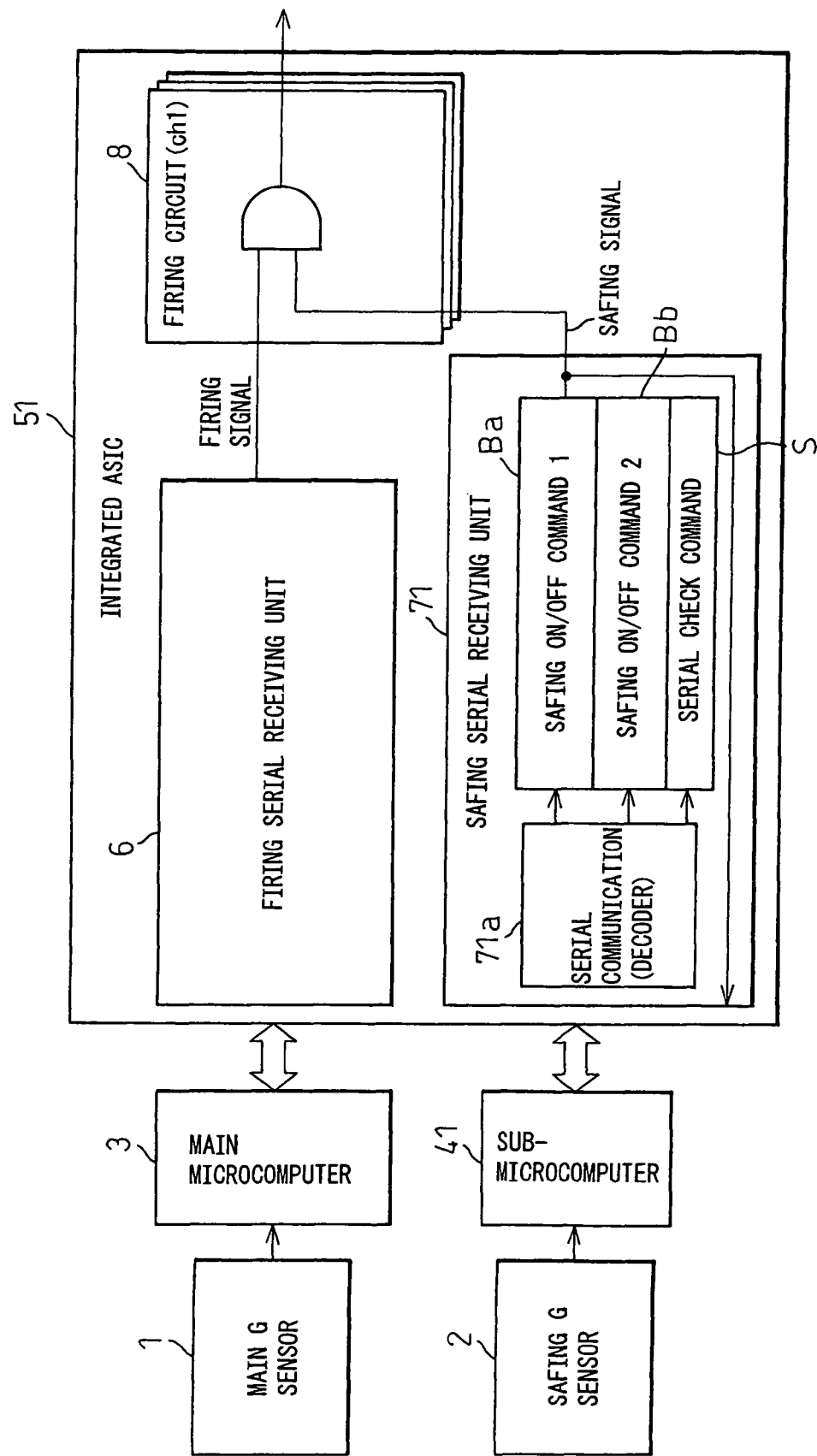
FIG. 8 is a block diagram showing the configuration of an air bag ECU according to a second embodiment of the present invention.

FIG. 8 is a diagram showing the configuration of an air bag ECU according to the present embodiment; as shown, the safing ON/OFF command 1 (Ba), safing ON/OFF command 2 (Bb), and serial check command S transmitted from the sub-microcomputer 4 are received by the serial communication circuit 71a in the safing serial receiving unit 71 accommodated on the integrated ASIC 51.

FIG. 9 is a command table showing the characteristics of the safing ON/OFF commands 1 and 2 according to the present embodiment, and FIG. 10 shows one example of the channel energization control using the safing ON/OFF commands 1 and 2 according to the present embodiment. As shown in FIG. 9, the safing ON/OFF commands 1 and 2 specify the channels by setting the corresponding data bits in positions 7 to 14 to "1" for safing ON or "0" for safing OFF, and are output in succession as shown in FIG. 10(f), with provisions made so that when the corresponding bit value matches between the two commands, the safing is set according to the bit value, but when it does not match, the previous safing state is retained (the bit value is rendered invalid). The function of the serial command is the same as that shown in the first embodiment.

In FIG. 10, as in FIGS. 4 and 7, parts (a) to 10(e3) show the energization states of the channels 1 to 3. In FIG. 10, when the firing command A is output at time t1 following the output of the safing ON command B1, the energization states of ch1, ch2, and ch3 should change from deenergized to energized but, due to a bit error occurring in the safing ON command output for ch2, the bit does not match between the commands 1 and 2 for ch2 which thus remains in the deenergized state as shown in part (e2). Since this state is checked by the serial check command S1 output 500 µs after the safing ON command B1, the sub-microcomputer 41 outputs the safing ON command B2 again for ch1 to ch3 at time t2.

As a result, the energization state of ch2 changes from deenergized to energized. The safing ON command B2 is also output for ch1 and ch3 already put in the energized state; here, if a bit error occurs and the bit does not match between the commands 1 and 2 for any one of the channels, the command is rendered invalid, and the previous state, i.e., the energized state, is retained. Here, the safing OFF command is enabled and the energization stopped only when the corresponding bits in the safing ON/OFF commands 1 and 2 are both set to "0"; since the probability that bit errors occur in both of the commands 1 and 2 is extremely low, any channel once set to the energized state is prevented from being erroneously deenergized due to a bit error occurring in the safing ON command.

The condition in which all the channels 1 to 3 have been put in the energized state is confirmed by the safing state echo back effected by the serial check command S2, and the safing ON command is not output thereafter.

Embodiment 3

Figure 11:
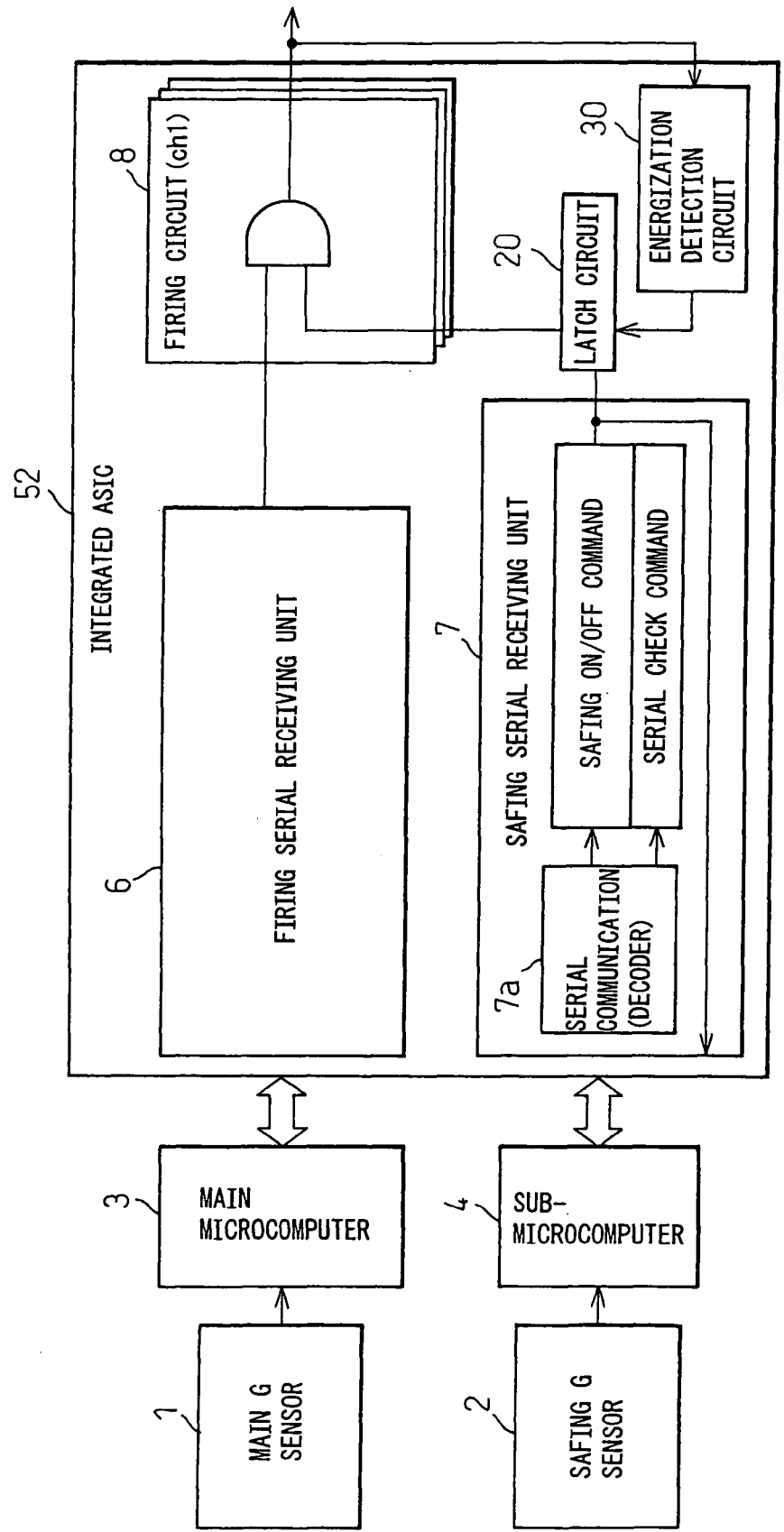
FIG. 11 is a block diagram showing the configuration of an air bag ECU according to a third embodiment of the present invention.

The configuration and operation of a third embodiment of the present invention will be described below with reference to FIGS. 11 and 12. In this embodiment, the format of the safing ON/OFF command is the same as that of the prior art shown in FIG. 3, but the difference is that the circuit is configured to detect the energization state of the air bag on each channel and, if the channel is in the energized state, the safing ON command is forcefully continued in order to retain that state. For this purpose, the integrated ASIC 52 shown in FIG. 11 includes a latch circuit 20 for latching the output of the safing serial receiving unit 7 and an energization detection circuit 30 for setting the latch circuit 20 in a latch mode by detecting the energized state of the corresponding channel.

Figure 12:
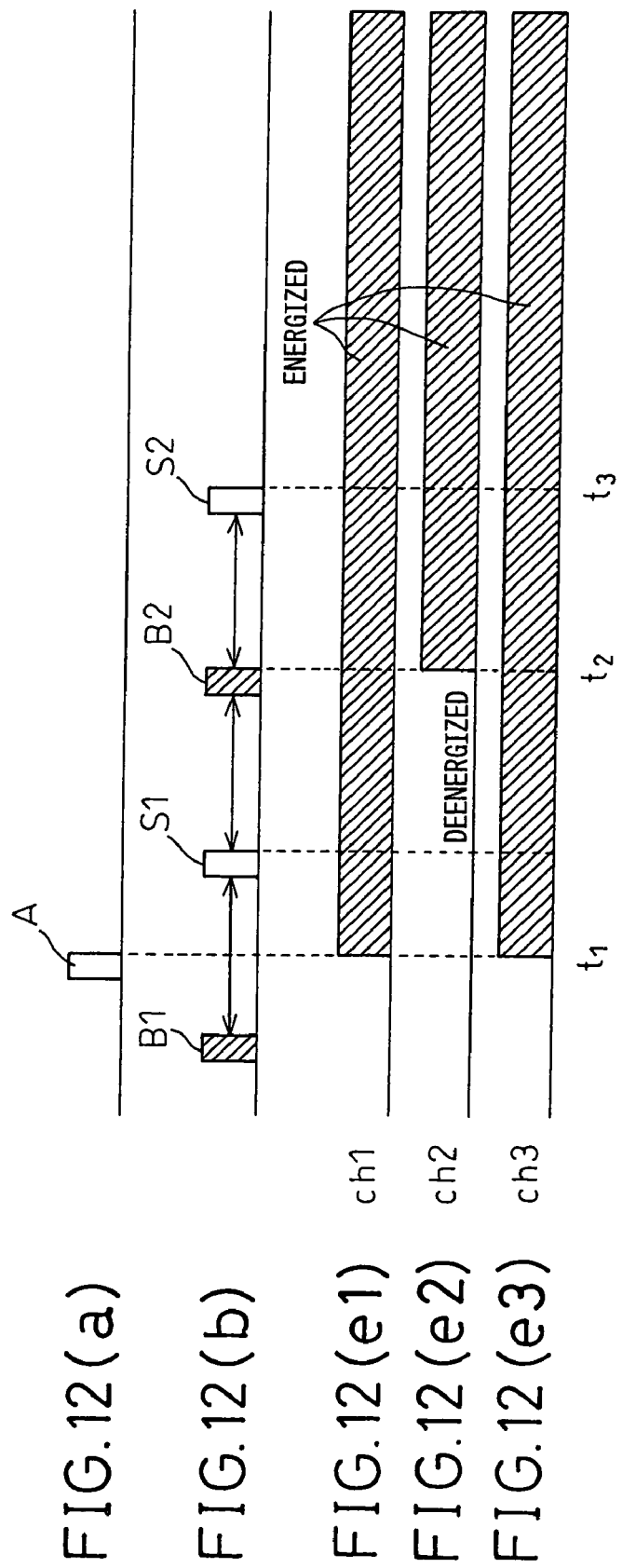
FIG. 12(e1) shows the energization state of channel 1 (ch1) in the ECU of FIG. 11.

Accordingly, when the channels ch1 and ch2 are in the energized state during the period from t1 and t2 by the safing ON command B1 output for the channels ch1 to ch3, as shown in FIG. 12, the energization detection circuit 30 detects the energized states of the channels ch1 and ch2 and keeps them in the energized state by controlling the latch circuit 20 for these channels. On the other hand, the channel 2 remains in the deenergized state during the period from t1 to t2 due to a bit error in the command B1; this state is detected by the serial check command S1, and the safing ON command B2 is output at time t2, whereupon the energization state of the channel 2 changes to the energized state.

The command B is also output for the channels 1 and 3 at time t2; here, if a bit error occurs, for example, in the command output for the channel 1, since the safing outputs of the channels 1 and 3 each retain the safing ON request of the command B1 by the action of the latch circuit 20, the channel 1 is held in the energized state at time t2, as a result of which all the channels 1 to 3 are put in the energized state at time t3. This state is confirmed by the serial check command S2.

In this way, by the inclusion of the energization detection circuit 30 and the latch circuit 20, the air bag ECU of the present embodiment can solve the problem of short-time energization occurring due to a bit error in the safing ON/OFF command.

Embodiment 4

Figure 13:
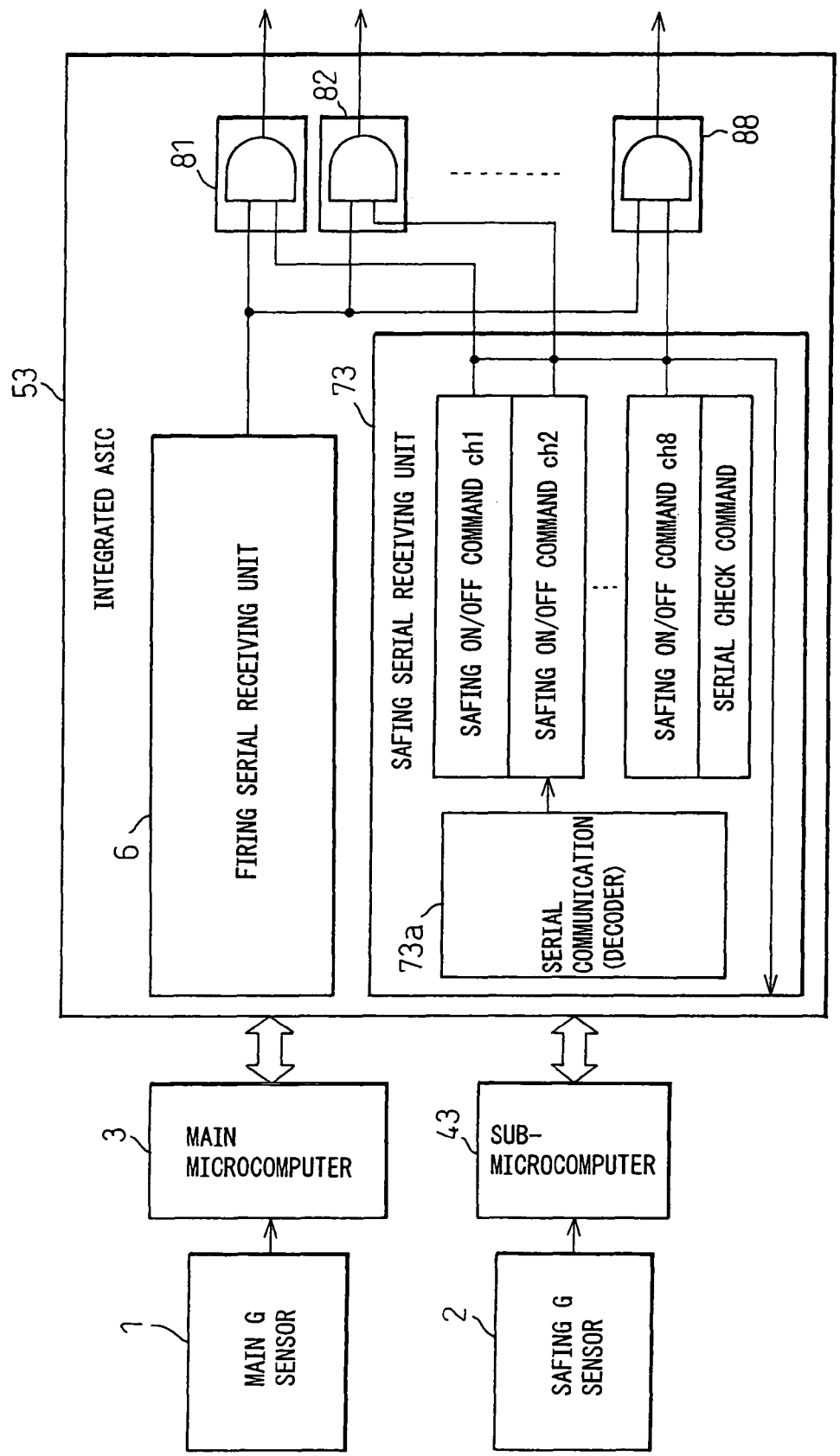
FIG. 13 is a block diagram showing the configuration of an air bag ECU according to a fourth embodiment of the present invention.
Figure 14:
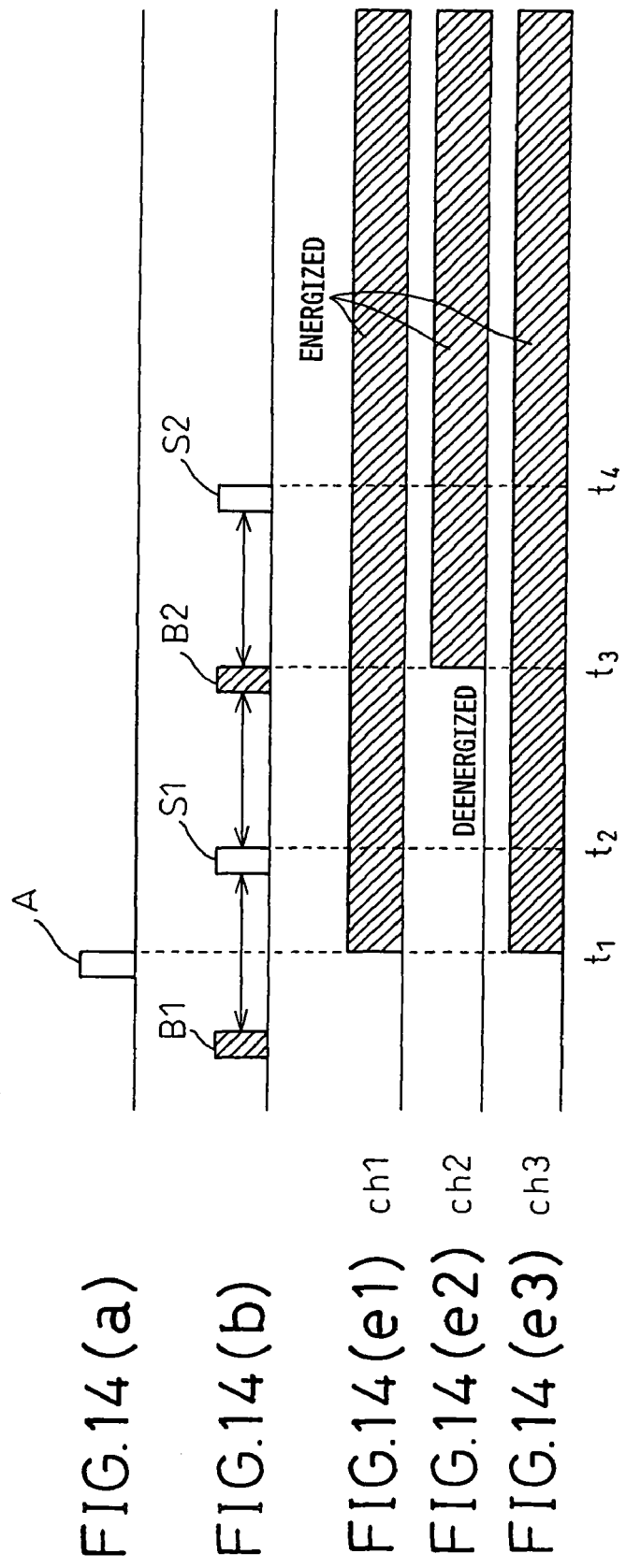
FIG. 14(e1) shows the energization state of channel 1 (ch1) in the ECU of FIG. 13.

A fourth embodiment of the present invention will be described below with reference to FIGS. 13 and 14. This embodiment differs from the first to third embodiments in that the safing ON/OFF command is generated separately for each channel, i.e., the sub-microcomputer 43 shown in FIG. 13 outputs a safing ON/OFF command ch1 for channel 1, a safing ON/OFF command ch2 for channel 2, ..., and a safing ON/OFF command ch8 for channel 8. These commands are decoded by the decoder 73a in the safing serial receiving unit 73 accommodated on the integrated ASIC 53, and are supplied to the firing circuits 81, 82, ..., 88 provided for the respective channels.

Accordingly, when deenergization due to a bit error is detected by the serial check command, the safing ON signal need be retransmitted only for the channel on which the deenergization was detected, and the safing ON signal need not be retransmitted for the other channels that have already been put in the energized state by the previous safing ON command.

To explain this with reference to FIG. 14, when the safing ON commands B1 are output for the channels 1 to 3, and subsequently the firing command A is output at time t1, if the safing ON commands B1 are correctly transmitted to the channels 1 to 3, all the channels 1 to 3 will be set to the energized state at time t1. On the other hand, if the safing ON command B1 for the channel 2 is not correctly transmitted as the safing ON command due to a bit error, the channel 2 is not put in the energized state at time t1, but remains in the deenergized state, as shown in part (e2).

This state is detected by the serial check command S1 at time t2, and the sub-microcomputer 43 thus realizes that the channel 2 that should be set to the energized state remains in the deenergized state. As a result, at time t3 the sub-microcomputer 43 outputs the safing ON command B2 only for the channel 2, trying to set the channel 2 to the energized state. Whether the channel 2 has been successfully set to the energized state or not can be checked by the serial check command S2 output at time t4.

In this way, in the air bag ECU of the present embodiment, if a channel is detected to which a false safing OFF command has been transmitted due to a bit error in the transmitted command, the safing ON command is retransmitted only for that channel, and the other channels that have been set to the safing ON state (energized state) by the first safing ON command are therefore unaffected by the second safing ON command; as a result, short-time energization does not occur here.

Embodiment 5

FIG. 15 is a command table for explaining a fifth embodiment according to the present invention. The safing ON/OFF command of this embodiment uses two bits to specify one channel. The safing is ON when the two bits are set to "11" and OFF when they are set to "00". More specifically, as shown in FIG. 15, the channel 1 is specified using the data bits D0 and D1, and the data bits D0 and D1 are both set to "1" when transmitting the safing ON command to the channel 1. On the other hand, when transmitting the safing OFF command, the data bits D0 and D1 are both set to "0". When the data bits D0 and D1 are set to "01" or "10", the data bits are rendered invalid, and the previous data state is retained.

Since there is virtually no possibility of the two bits being simultaneously in error, when two bits are used for each command as in the present embodiment, any channel once set to the energized state by the safing ON command does not erroneously receive the subsequently transmitted safing ON command as a safing OFF command due to a bit error. As a result, the short-time energization problem such as shown in FIG. 4 does not occur here.

Embodiment 6

Figure 16:
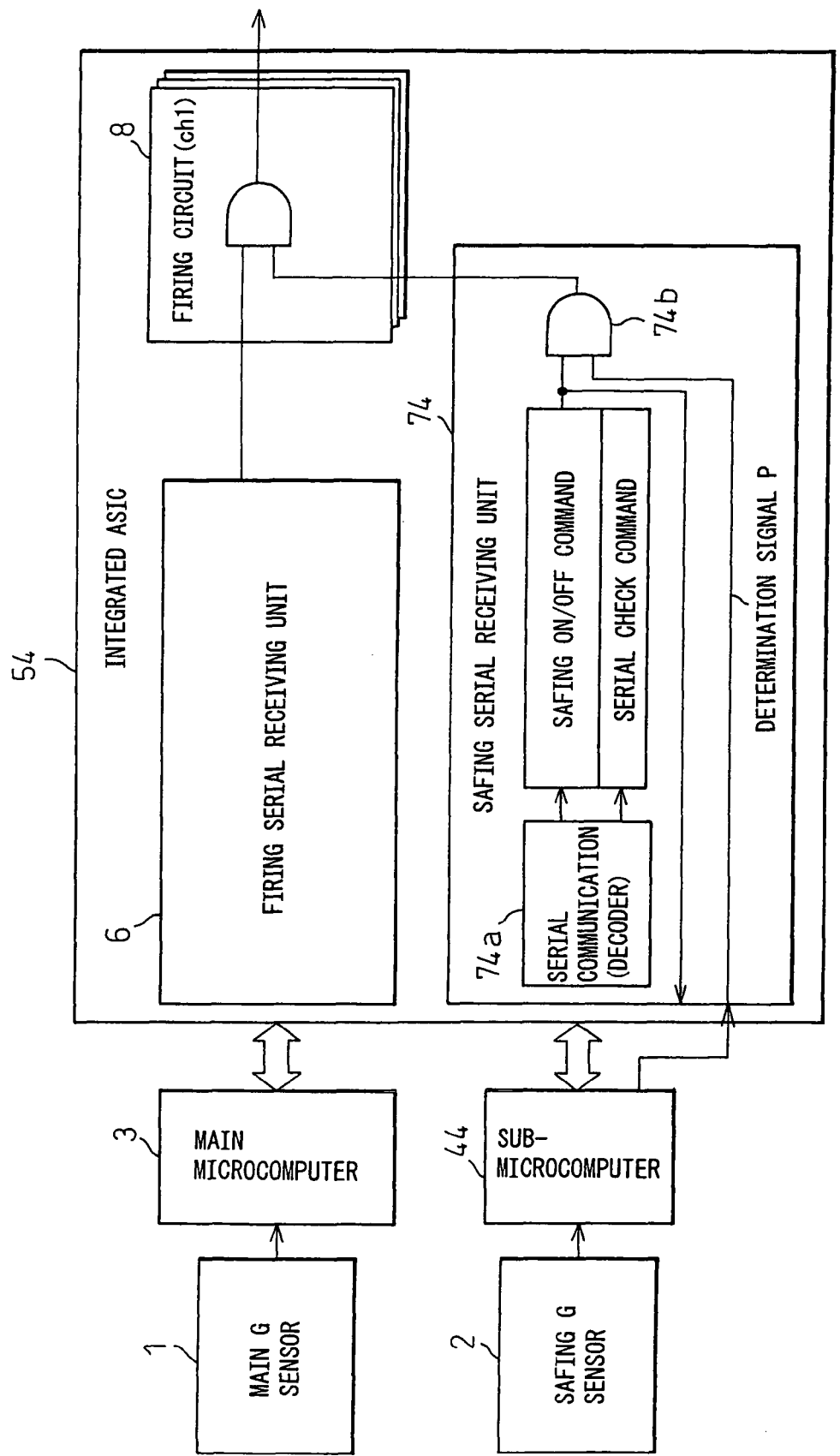
FIG. 16 is a block diagram showing the configuration of an air bag ECU according to a sixth embodiment of the present invention.

FIGS. 16 and 17 are diagrams explaining a sixth embodiment according to the present invention. In the air bag ECU shown in FIG. 16, the safing serial receiving unit 74 in the integrated ASIC 54 includes a serial communication circuit 74a and a gate circuit 74b. When a determination signal P is input from the sub-microcomputer 44, the gate circuit 74b opens and passes the command received by the serial communication circuit 74a on to the firing circuit 8.

The determination signal P is a signal that the sub-microcomputer 44 outputs upon confirming, by echo back of the command received by the serial communication circuit 74a, that the transmitted command has been received correctly by the safing serial receiving unit 74. Accordingly, in the present embodiment, each channel remains in the deenergized state as long as the determination signal P is not output.

This will be explained with reference to the timing diagram of FIG. 17. The sub-microcomputer 44 outputs the safing ON command B1 for the channels 1 to 3, and subsequently outputs the serial check command S1 to check whether the outputs to the channels 1 to 3 have been set to safing ON by the command B1. If the sub-microcomputer 44 realizes that the output to the channel 2 is not set to safing ON, for example, the sub-microcomputer 44 outputs the safing ON command B2 again for the channels 1 to 3, trying to set all the outputs to the channels 1 to 3 to the safing ON state.

When it is detected by the serial check command S2 that the safing ON command has been correctly received for all the channels 1 to 3, the sub-microcomputer 44 outputs the determination signal P at time t1, whereupon the gate 74*b* in FIG. 16 opens, and the safing signal is supplied to the firing circuits 8 corresponding to the channels 1 to 3; as a result, the channels 1 to 3 are simultaneously set to the energized state. Accordingly, the short-time energization problem such as shown in FIG. 4 does not occur in the ECU of the present embodiment.

EFFECT

As described above, according to the air bag control apparatus of the present invention, even when a bit error occurs in the command signal transmitted to set or clear the safing state, the air bag can be inflated reliably since the occurrence of an abnormality such as the so-called short-time energization can be prevented.

What is claimed is:

1. An air bag control apparatus comprising:
a first electronic circuit for generating a firing command based on an output of a main acceleration sensor;
a second electronic circuit for generating a safing ON command for clearing a safing state, based on an output of a safing acceleration sensor different from said main acceleration sensor; and
a firing circuit for generating an air bag inflation permit signal when said firing command and said safing ON command are both activated,
wherein said second electronic circuit further generates a safing OFF command separately from said safing ON command, and sets said safing state by said safing OFF command, and wherein said safing ON command and said safing OFF command are independent of each other.

2. An air bag control apparatus comprising:
a first electronic circuit for generating a firing command based on an output of a main acceleration sensor;
a second electronic circuit for generating a safing ON command for clearing a safing state, based on an output of a safing acceleration sensor; and
a firing circuit for generating an air bag inflation permit signal when said firing command and said safing ON command are both activated,
wherein said second electronic circuit generates a safing OFF command separately from said safing ON command, and sets said safing state by said safing OFF command, and wherein said second electronic circuit further generates a check command for detecting, by echo back, an input state to said firing circuit that has been set by said safing ON command.

3. An air bag control apparatus as claimed in claim 2, wherein when it is detected by said check command that the input state of said firing circuit is not set to a safing cleared state even if said safing ON command was transmitted, said second electronic circuit retransmits said safing ON command.

4. An air bag control apparatus comprising:
a first electronic circuit for generating a firing command based on an output of a main acceleration sensor;
a second electronic circuit for generating an ON command for clearing a safing state, based on an output of a safing acceleration sensor; and
a firing circuit for generating an air bag inflation permit signal when said firing command and said ON command are both activated,
wherein said second electronic circuit generates separately from said safing ON command an OFF command for setting said safing state, and wherein when said ON command or said OFF command is invalid, a previous safing state is retained.

5. An air bag control apparatus as claimed in claim 1, wherein said second electronic circuit further generates a check command for detecting, by echo back, an input state to said firing circuit that has been set by said safing ON command.

6. An air bag control apparatus as claimed in claim 5, wherein when it is detected by said check command that the input state of said firing circuit is not set to a safing cleared state even if said safing ON command was transmitted, said second electronic circuit retransmits said safing ON command.

* * * * *